United States Patent [19]

Piccolo et al.

[11] 4,077,794

[45] Mar. 7, 1978

[54] METHOD FOR THE MANUFACTURE OF SOIL MODIFIERS FROM WASTE MATERIALS OF THE MANUFACTURE OF TITANIUM DIOXIDE

[75] Inventors: Luigi Piccolo; Antonio Paolinelli, both of Milan, Italy

[73] Assignee: Societa' Italiana Resine S.I.R. S.p.A., Milan, Italy

[21] Appl. No.: 775,683

[22] Filed: Mar. 8, 1977

[51] Int. Cl.$^2$ .............................................. C05D 9/00
[52] U.S. Cl. ........................................... 71/31; 71/40; 71/63; 71/64 SC; 423/548; 423/632
[58] Field of Search ..................... 71/1, 25, 31, 40, 51, 71/53, 61, 63, 64 A, 64 R, 64 SC; 423/548, 632, 633

[56] References Cited

U.S. PATENT DOCUMENTS

| 2,741,876 | 4/1956 | Paolini | 71/63 X |
|---|---|---|---|
| 2,795,495 | 6/1957 | Schmatloch et al. | 71/63 X |
| 3,936,292 | 2/1976 | Piccolo et al. | 71/63 |
| 3,974,267 | 8/1976 | Urban, Jr. | 423/633 |
| 4,045,205 | 8/1977 | Piccolo et al. | 71/31 |

FOREIGN PATENT DOCUMENTS

| 1,144,248 | 2/1963 | Germany | 423/632 |
|---|---|---|---|

*Primary Examiner*—Charles N. Hart
*Assistant Examiner*—Ferris H. Lander
*Attorney, Agent, or Firm*—Sughrue, Rothwell, Mion, Zinn and Macpeak

[57] ABSTRACT

A soil modifier comprising from 80 to 95% by weight of a mixture of ferric oxide and ferric sulphate in an oxide/sulphate weight ratio of from 0.25:1 to 1:1, is prepared by calcining at 500°–600° C in an oxidizing atmosphere a blend of by-product obtained in the manufacture of titanium oxide by the sulphate process, with at least 20% by weight with respect to said by-product, of a material based on ferric sulphate and/or ferric oxide. Calcining is then continued under the same conditions, replacing said material in the blend continuously fed in by a recycle fraction of the product continuously discharged.

7 Claims, No Drawings

METHOD FOR THE MANUFACTURE OF SOIL MODIFIERS FROM WASTE MATERIALS OF THE MANUFACTURE OF TITANIUM DIOXIDE

This invention relates to a method for the manufacture of soil modifiers, highly active on compact soils and easy and economical to apply, from the waste materials consisting essentially of ferrous sulphate heptahydrate, obtained in the manufacture of titanium dioxide by the sulphate process.

As is known, many of the world's countries have vast areas of very compact soil, especially clay soils, little suitable for cultivation.

In these soils the structure is such that the composition of particles practically prohibits the circulation of air and water and consequently also the passage of salts from the surface to the root system of the plants.

In such soils water penetrates very slowly, causing expansion of the clay particles which induces closure of the pores or prevents further ingress of water, passage of salts, and circulation of air.

On the other hand during the dry season, water present in these soils, owing to the continuous capillary channels which are always characteristic of hard clay soils, works to the surface carrying with it, also, the salts dissolved in it.

These soils thus come to assume the state of dryness which gives rise to deep cracks and cementing of the clay particles into a hard and compacted mass.

Under these conditions the life cycle becomes difficult, not only because of insufficient presence of water and insufficient aeration, but also because of the high concentration of salts near the surface.

In methods for modifying the characteristics of compact soils, especially clay soils, so as to render them suitable for cultivation, recourse is frequently made to the application of salts, usually ferric, such as ferric-ammonium alum and ferric sulphate.

These salts induce agglometation of the minute clay particles into granules, with appreciable improvement in the permeability and aeration of the said soil. Moreover, a porous granular structure diminishes the dangers of scouring and soil erosion.

Agricultural use of ferric sulphate made by conventional methods (sulphation of ferric oxides) is, however, economically onerous.

It has now been found that compact soil modifiers containing ferric oxide and ferric sulphate, having a high and lasting activity and of easy and economical application can be manufactured from the waste materials obtained in the manufacture of titanium dioxide from ilmenites or ilmenite slags by the sulphate method, said waste materials consisting essentially of ferrous sulphate heptahydrate.

Therefore an object of this invention is a method for the preparation of modifiers for compact soils, using waste materials of the manufacture of titanium dioxide from ilmenites or ilmenite slags by the sulphate method.

It is known that in the manufacture of titanium dioxide from ilmenites or ilmenite slags by the sulphate method, one of the more serious problems is constituted indeed by the waste materials.

In fact, owing to the scant possibility of using these waste materials, considering also their high impurity content, and since their direct disposal caused considerable pollution, as their reducing properties, their toxicity and the large amounts involved lead to considerable environmental changes, the need is evident to convert them suitably into products devoid of the drawbacks described above.

Obviously the best solution would be to convert the waste products of the manufacture of titanium dioxide into materials which can be advantageously used, this been made possible by the process of this invention.

Thus, the invention provides a process for producing a soil modifier comprising from 80 to 95% by weight of a mixture of ferric oxide and ferric sulphate in an oxide/sulphate weight ratio of from 0.25:1 to 1:1, which comprises: (a) an initial step of formation of said soil modifier by calcining at a temperature of from 500° to 600° C, in the presence of an oxidizing gas, a blend of (i) a by-product consisting essentially of ferrous sulphate heptahydrate, obtained in the manufacture of titanium dioxide from ilmenite or ilmenite slags by the sulphate process, and (ii) a material containing at least 80% by weight of ferric sulphate and/or ferric oxide, said calcining being carried out for a periods such as to convert from 80 to 95% by weight of said ferrous sulphate into ferric oxide and ferric sulphate and said material being present in said blend in an amount of at least 20 wt.% with respect to said by-product, and (b) a continuous operation step of production of said soil modifier by continuing said calcining under the conditions of (a), continuously feeding the blend to the calcining zone and continuously discharging the soil modifier from the calcining zone, said material (ii) of said blend being replaced in step (b) by a fraction of the discharged soil modifier which is continuously recycled. The said material (ii) may be constituted by any mixture containing at least 80% of ferric oxide and/or ferric sulphate. The presence of low amounts of compounds other than ferric oxide and ferric sulphate is generally not detrimental to the purposes of the invention, provided that said compounds do not adversely affect the cultivation. Thus, for example, the material (ii) may be constituted by a recycle soil modifier obtained from previous calcining operations according to the process of the invention. It is also possible to use as material (ii) a mixture obtained in a preliminary calcining treatment under the general conditions of step (a), when said mixture is little suited as a soil modifier. Such may be the case, for instance, when the reaction parameters are inadvertently taken beyond the required values, resulting for example in the production of a mixture having an excessively high ferric oxide content. In this case, the said mixture is conveniently recycled for use as material (ii). Generally, the material (ii) is constituted by ferric sulphate, ferric oxide or, preferably, a mixture of both.

The soil modifier cannot be produced by direct calcining of the by-product. In fact, if one feeds the by-product as such directly to the calcinator, the former causes very resistant incrustations, which in time block the calcinator.

On the contrary, by feeding a blend of said by-product with at least 20% by weight with respect to the by-product, of said material (ii) or said recycle soil modifier, this drawback is completely avoided.

The amount of material (ii) or recycle soil modifier in the blend should preferably not exceed 50% by weight with respect to the by-product. The most suitable amount of material (ii) in the blend should be adjusted in each individual case in the range shown, according to the composition of said material, the selected calcining conditions and the composition desired for the soil modifier.

The by-product may be blended with the material (ii) or the recycle product according to one of the many known methods for this purpose, e.g. in pulverizing mixers, in hammer mills, in ball grinders or the like.

The calcination may be carried according to known methods, the method preferred for this invention being calcination by means of a rotating calcinator.

Generally, under the aforesaid conditions, the period of stay of the blend in the calcinator should be from 2 to 5 hours. The oxidizing gas may be oxygen or a gas containing molecular oxygen, such as air.

Under the given temperature conditions the ferrous sulphate is converted in the proportions shown into a mixture of ferric oxide and ferric sulphate in an oxide/sulphate weight ratio varying generally from 0.25:1 to 1:1.

If the calcination temperature is taken beyond 600° C a sensible decomposition of the ferric sulphate occurs, which at above 680° C becomes practically complete. In practice, beyond 680° C one obtains a solid product consisting essentially of iron oxide and a gaseous effluent containing oxides of sulphur which can be used to manufacture sulphuric acid. In other words, carrying out the calcination above 600° C one obtains a solid with a content of ferric sulphate varying in inverse ratio to the calcination temperature, whilst the gases evolved contain consequently, increasing amounts of oxides or sulphur produced by decomposition and which can be used to manufacture sulphuric acid.

It should be pointed out that the modifiers obtained according to the invention do not consist exclusively of ferric oxide and ferric sulphate in the proportions shown, but that they also include many other compounds originally present in small amounts in the by-product of the manufacture of titanium dioxide, such as compounds of magnesium, aluminium, titanium and others.

We do not know whether these compounds are directly active as soil modifiers, or exert any influence upon said mixtures of ferric oxide and ferric sulphate. However, comparing under the same conditions, the soil-modifying activity of simple mechanical blends of ferric oxide and ferric sulphate, in the same proportions as those of the soil modifiers obtained by this invention, with the activity of the latter, the latter are surprisingly more active, as will be clearly shown in the examples.

The blend reacts along the course of the calcinator completely evenly, giving rise to the formation of subdivided and free-flowing powders, easy to handle and measure, with very slight dragging away of the powders within the gases.

Their size is generally from 0.05 to 3 mm, and typically from 0.1 to 2 mm.

The products thus obtained can be applied directly in agriculture as soil modifiers, and they are especially advantageous, both because of their high activity and because of the fact that they are conversion products of unwanted wastes.

These products can be used for soil conditioning in amounts which vary especially with the degree of hardness of the soil. Thus, in soils which are not excessively compact, from 25 to 50 metric quintals per hectare are sufficient, whilst in very compact clay soils one would usually apply from 50 to 150 metric quintals per hectare.

The invention will now be illustrated by the following examples which do not, however, restrict its range.

EXAMPLE 1

There was used a by-product of the manufacture of titanium dioxide from ilmenite by the sulphate process, having the following composition by weight:

$FeSO_4.7H_2O$ — 88.6%
$Al_2(SO_4)_3.18H_2O$ — 0.8%
$CaSO_4.2H_2O$ — 0.26%
$H_2SO_4$ free — 0.09%
$MgSO_4.7H_2O$ — 6.8%
$MnSO_4.5H_2O$ — 0.56%
$TiOSO_4$ — 0.18%
$H_2O$ free — 2.7%
Other products — traces.

This by-product was in the form of friable aggregates of small crystals.

70 parts by weight of said by-product were mixed in a pulverizing mixer with 19 parts by weight of commercial ferric sulphate and 11 parts by weight of ferric oxide obtained by roasting of pyrite.

The resulting mixture was then fed in countercurrent with hot air, at a rate of 85 Kg/hr, into a rotary calcinator with the following dimensions:
inner diameter: 500 mm
length: 10 m Operation was carried out under the following conditions:
temperature of the hot gases (air) entering the calcinator: 740° C
temperature of the gases issuing from the calcinator: 140° C
inlet temperature of the solids mixture: 25° C
outlet temperature of the solids mixture: 540° C
period of stay: 4 hours
excess of combustion air: 35%

Operation was carried out under these conditions for 8 hours, obtaining 56.5% Kg/hr of a granular product having the following composition by weight: 62% of $Fe_2(SO_4)_3$, 25.5% of $Fe_2O_3$, 8% of $FeSO_4$, 2.5% of $MgSO_4$ and 2% of other compounds.

A fraction of the calcined product was then continuously recycled to the calcinator upon mixing with 70 parts of by-products for each 30 parts by weight of recycle product. The mixture was fed to the calcinator at a rate of 25.5 Kg/hr of recycle product and 59.5 Kg/hr of by-product. Operation was carried out under the conditions described above for a period of 200 hours. No incrustation was observed in the calcinator and the calcined product thus obtained had the following average composition by weight: 61.5% of $Fe_2(SO_4)_3$, 24.5% of $Fe_2O_3$, 8.5% of $FeSO_4$, 4.0% of $MgSO_4$ and 1.5% of other products.

EXAMPLE 2 (comparative)

The run of Example 1 was repeated, using a recycle product having the following composition by weight: 63% of $Fe_2(SO_4)_3$, 22.5% of $Fe_2O_3$, 9.2% of $FeSO_4$, 4.3% of $MgSO_4$ and 2.0% of other compounds. The calcinator was operated under the following conditions.
inlet temperature of the hot gases: 950° C
outlet temperature of the gases: 145° C
inlet temperature of the solids mixture: 25° C
outlet temperature of the solids mixture: 660° C
period of stay: 4 hours
excess of combustion air: 10%

The gases issuing from the calcinator had the following content in sulphur oxides:
$SO_2$ — 0.85 g/m3

SO₃ 13 0.54 g/m3

Analysis of the solid product, discharged at a rate of 27 Kg/hour, gave the following results:

$Fe_2(SO_4)_3$ — 3.3%
$Fe_2O_3$ — 91.5%
$FeSO_4$ — 1.2%
$MgSO_4$ — 2.0%
Others — 2.0%

EXAMPLE 3 (Comparison)

The run of Example 1 was repeated, feeding the by-product as such to the calcinator. After 30 minutes, running had to be stopped, since all the material was adhering to the walls of the calcinator in the form of a very resistant incrustation.

EXAMPLE 4

The activity as soil modifier of the product in Example 1 was investigated.

As laboratory characterisation tests of the conditioning activity a percolation rate test was carried out and determination of the distribution of the clay/silt/sand fractions on a sample of soil treated with the modifier as compared with a sample of non-treated soil.

In the following, as clay are intended particles of a diameter less than 0.002 mm, as silt particles of from 0.002 to 0.02 mm, and as sand, particles with a diameter greater than 0.02 mm.

The soil used for testing the product was of the alkaline clay type, originating in Santaluce (Pisa) and had the following composition:

pH = 8
Chemical composition:
$Al_2O_3$ = 11.8%; $SiO_2$ = 39.1%; $Na_2O$ = 0.55%; $K_2O$ = 3.5%;
$TiO_2$ = 0.8%; CaO = 11.4%; MgO = 3.2% $Fe_2O_3$ = 6.1%;
$CO_2$ = 5.7%; ions $SO_4$ = 0.01%.
Exchangeable cations:
Na = 0.017%; K = 0.040%; Ca = 0.21%
Mineral composition:
Illite- Montmorillenite = 10%; Illite = 25%
Chlorite = 35%; Chlorite-Vermiculite = 30%
Percentages are by weight.

For characterisation tests the product was incorporated into the said soil, in an amount of 1%, distributing it homogeneously; the mixture obtained was humidified and then left to mature for 250 hours.

Finally, the whole was de-aggregated and sifted.

The product with less than 2 mm granulometry was charged as a layer 100 mm thick into a percolator of diameter equal to 50 mm.

The percolation test was carried out by maintaining a constant head of water, equal to 100 mm, above the surface of the soil.

The comparison test was carried out in the same way on the same type of soil, without the addition of modifier, but prepared similarly to the modified soil.

In this way the treated soil allowed percolation of 345 ml of water in two hours, whereas the non-treated check soil allowed percolation of only 85 ml of water.

The test to determine the clay/silt/sand fractions was effected by the S.I.S.S. (International Society of Soil Science) process.

This process effects de-aggregation of the soil by treatment with boiling solutions of ammonium carbonate and then with a solution of sodium hydroxide.

The particle size of the fractions is then determined on the de-aggregated soil using the Andreasen apparatus.

Both the S.I.S.S. process and Andreasen's apparatus are described in Soil Sci. 39, 263 (1935).

In the sample of soil treated the following distribution by weight was recorded: clay 6%; silt 56%; sand 38%.

In the comparison sample of non-treated soil, on the other hand, the following distribution by weight was recorded: clay 40%; silt 38%; sand 22%.

The same conditioner was applied in the field on the same Santaluce type of soil in an amount of 10 metric tons per hectare, 5 tons of which were applied in Autumn during ploughing which was carried out to a depth of about 35 cm, whilst the remaining 5 tons were applied in the following Spring, incorporating them in the soil by harrowing to a depth of 10 cm.

On the soil thus treated, and on the compared soil worked in the same way but not treated with modifier, sorghum seed was sown.

In the soild treated with modifier a yield of 24 metric quintals per hectare of sorghum grain was obtained, whilst in the compared soil a yield of 7 metric quintals per hectare was obtained.

EXAMPLE 5 (comparison)

Activity of the product of comparative Example 2 as a soil conditioner was investigated, using the same procedure and conditions as in Example 4.

In the percolation test the sample of treated soil allowed percolation of 95 ml of water in two hours, as against the 85 ml in the sample of non-treated soil.

In the test to determine the clay/silt/sand distribution in the sample of treated soil the following distribution by weight was recorded: clay 33%; silt 43%; sand 24%.

In field application the yield of sorghum grain was of 10 metric quintals per hectare in the treated soil as against 7 metric quintals per hectare in the non-treated soil.

EXAMPLE 6 (comparison)

A soil modifier was prepared by mechanically mixing commercial ferric sulphate and iron oxide derived from total thermal oxidation of ferrous sulphate at 950° C, in the proportions of the product as in Example 1.

With this mixture there were faithfully reproduced the characterisation tests in the laboratory and in the field as in Example 4.

In the percolation test the sample of treated soil allowed percolation of 280 ml of water in 2 hours as against the 85 ml of the sample of non-treated soil.

In the test to determine the distribution of clay/silt/sand in the sample of treated soil the following distribution by weight was recorded:

Clay 11%; silt 55%; sand 34%.

In application on the field the yield of sorghum grain was of 21 metric quintals per hectare in the soil treated as against the 7 metric quintals per hectare in the non-treated soil.

Comparing Examples 6 and 8 one sees that the effect of the modifier obtained according to this invention is appreciably higher in relation to that of a mechanical mixture of ferric oxide and ferric sulphate.

What we claim is:

1. A process for producing a soil modifier comprising from 80 to 95% by weight of a mixture of ferric oxide and ferric sulphate in an oxide/sulphate weight ratio of from 0.25:1 to 1:1, which comprises:

(a) an initial step of formation of said soil modifier by calcining at a temperature of from 500° to 600° C, in the presence of an oxidizing gas, a blend of (i) a by-product consisting essentially of ferrous sulphate heptahydrate, obtained in the manufacture of titanium dioxide from ilmenite or ilmenite slags by the sulphate process, and (ii) a material containing at least 80% by weight of ferric sulphate and/or ferric oxide, said calcining being carried out for a period such as to convert from 80 to 95% by weight of said ferrous sulphate into ferric oxide and ferric sulphate and said material being present in said blend in an amount of at least 20 wt.% with respect to said by-product, and (b) a continuous operation step of production of said soil modifier by continuing said calcining under the conditions of (a), continuously feeding the blend to the calcining zone and continuously discharging the soil modifier from the calcining zone, said material (ii) of said blend being replaced in step (b) by a fraction of the discharged soil modifier which is continuously recycled.

2. The process of claim 1, wherein said material (ii) consists essentially of ferric sulphate.

3. The process of claim 1, wherein said material (ii) consists essentially of a mixture of ferric sulphate and ferric oxide.

4. A process according to claim 1, wherein said material (ii) consists essentially of ferric oxide.

5. The process of claim 1, wherein said material (ii) is present in said blend in an amount not exceeding 50% by weight with respect to said by-product.

6. The process of claim 1, wherein said recycled fraction of soil modifier is present in the blend in step (b) in an amount not exceeding 50% by weight with respect to said by-product.

7. The process of claim 1, wherein oxygen or a gas containing molecular oxygen is used as oxidizing gas.

* * * * *